(12) United States Patent
Kuo et al.

(10) Patent No.: US 9,014,578 B2
(45) Date of Patent: Apr. 21, 2015

(54) TONE REPRODUCTION CURVE ERROR REDUCTION

(75) Inventors: YanFu Kuo, West Lafayette, IN (US); Chao-Lung Yang, Peoria, IL (US); George Tsu-Chih Chiu, West Lafayette, IN (US); Yuehwern Yih, West Lafayette, IN (US); Jan Allebach, West Lafayette, IN (US); Dennis Alan Abramsohn, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 119 days.

(21) Appl. No.: 13/809,283

(22) PCT Filed: Aug. 15, 2010

(86) PCT No.: PCT/US2010/045558
§ 371 (c)(1),
(2), (4) Date: Jan. 9, 2013

(87) PCT Pub. No.: WO2012/023924
PCT Pub. Date: Feb. 23, 2012

(65) Prior Publication Data
US 2013/0114965 A1  May 9, 2013

(51) Int. Cl.
*G03G 15/00* (2006.01)
*H04N 1/40* (2006.01)
*H04N 1/407* (2006.01)

(52) U.S. Cl.
CPC ....... *G03G 15/5033* (2013.01); *H04N 1/40006* (2013.01); *H04N 1/407* (2013.01)

(58) Field of Classification Search
CPC ............. G03G 15/01; G03G 15/5041; G03G 2215/00063; G03G 2215/00042
USPC ............ 399/39, 49, 38, 44, 46; 358/3.06, 3.1
See application file for complete search history.

(56) References Cited

U.S. PATENT DOCUMENTS

| | | | | |
|---|---|---|---|---|
| 5,471,313 | A | * | 11/1995 | Thieret et al. ................ 358/296 |
| 5,754,309 | A |   | 5/1998  | Chen et al. |
| 6,694,109 | B1 | * | 2/2004 | Donaldson et al. ............ 399/49 |
| 6,697,582 | B1 | * | 2/2004 | Scheuer ......................... 399/49 |
| 6,741,816 | B2 | * | 5/2004 | Shim et al. .................... 399/49 |
| 7,069,164 | B2 | * | 6/2006 | Viturro et al. ................. 702/85 |
| 7,239,819 | B2 | * | 7/2007 | Gross et al. .................... 399/49 |
| 7,239,820 | B2 | * | 7/2007 | Donaldson .................... 399/49 |
| 7,307,752 | B1 |   | 12/2007 | Mestha et al. |
| 7,471,420 | B2 | * | 12/2008 | Updegraff ................. 358/3.06 |

(Continued)

OTHER PUBLICATIONS

International Searching Authority, The International Search Report and the Written Opinion, May 20, 2011, 8 Pages.

(Continued)

*Primary Examiner* — Robert Beatty
(74) *Attorney, Agent, or Firm* — Law Offices of Michael Dryja (57) ABSTRACT

Control parameters of a printing device are optimized using a process model to reduce a process tone reproduction curve (TRC) error between a process TRC and a desired TRC. Tone-corrected halftone levels for the printing device are generated using a sensor model to reduce a printing device TRC error between a TRC of the printing device and the desired TRC, based on color patches printed by the printing device using the control parameters as have been optimized, as measured by one or more sensors of the printing device.

15 Claims, 3 Drawing Sheets

(56) References Cited

U.S. PATENT DOCUMENTS

| | | | |
|---|---|---|---|
| 7,603,047 B2* | 10/2009 | Akashi et al. | 399/49 |
| 8,090,281 B2* | 1/2012 | Hirota et al. | 399/49 |
| 8,437,040 B2* | 5/2013 | Taylor et al. | 358/1.9 |
| 2006/0087706 A1* | 4/2006 | Shim et al. | 358/504 |
| 2006/0251437 A1 | 11/2006 | Donaldson | |
| 2007/0076273 A1 | 4/2007 | Viturro et al. | |
| 2007/0139733 A1 | 6/2007 | Mizes et al. | |

OTHER PUBLICATIONS

C. Staelin et al., "Dot gain table and developer voltage prediction for the HP Indigo press," J. Imaging Sci. Tech., 49:620 (2005).

C. Yang et al., "Improving tone prediction accuracy in calibration for color electrophotography, part I—environmental and consumable factors," Proc. NIP25:686, (2009).

C.I.E. Recommendations on uniform color spaces, color difference equations, psychometric color terms. Supplement No. 2 to CIE publication No. 15 (E.-1.3.1) (1978).

C.J. Rosenberg, "Measurement-based evaluation of a printer dot model for halftone algorithm tone correlation," J. Electron. Imaging 2:205 (1993).

D.M. Pai et al., "Physics of electrophotography," Review of Modern Physics, 65:163 (1993).

E. Gross et al., "Xerographic printing system performance optimization by toner throughput control," J. Imaging Sci. Tech. 53:041207 (2009).

E.K.P. Chong et al., "An introduction to optimization," (Wiley-Interscience, New York, NY) (2001).

H. Liu et al., "The effect of relative humidity on the toner in the developing process," Proc. NIP17:848 (2001).

H.R. Kang et al., "Digital color halftoning," Society of Photo-Optical Instrumentation Engineers (SPIE), Bellingham, WA (1999).

J. Anderson, "An electronic model of triboelectrification of two-component electrophotographic developers," J. Imaging Sci. Tech. 33:200 (1989).

J. Shiau et al., "Semiautomatic printer calibration with scanners," J. Imaging Sci. Tech. 36:211 (1992).

K. Totsuka et al., "Tone curve stabilization for color electrophotography," Proc. NIP21:173 (2005).

M.A. Kriss, "Modeling an electro-photographic printer: part I, monochrome systems," Proc. SPIE 6493:64930N (2007).

N.R. Draper et al., "Small response-surface designs," Technometrics 32:187 (1990).

P. Li et al., "Robust stabilization of tone reproduction curves for the xerographic printing process," IEEE Trans. on Control Sys. Tech., 9:407 (2001).

P. Ramesh, "Modeling and control of toner material state in two component development systems," J. Imaging Sci. Tech, 53:041206 (2009).

T. Haseagwa et al., "Effects of particle size and atmosphere on tribocharging of polymer powders," Proc. NIP16:723 (2000).

T.N. Pappas et al., "Model-based digital halftoning," IEEE Signal Processing Magazine Special Issue on Digital Halftoning, 20:14 (2003).

T.P. Sim et al., "Using time-sequential sampling to stabilize the tone and color reproduction functions of a xerographic printing process," IEEE Trans. on Control Sys. Tech 15:249 (2007).

Y. Kuo et al., "Improving tone prediction accuracy in calibration for color electrophotography, part II—principal component regression," Proc. NIP25: 740 (2009).

* cited by examiner

TONE REPRODUCTION CURVE ERROR REDUCTION

BACKGROUND

Printing devices include electrophotographic (EP) (i.e., xerographic) printing devices, such as laser printing devices like laser printers. EP and other types of printing devices use halftoning as a way to reproduce continuous-tone images using binary tones. For example, each part of a digital image to be printed may have for a given color a particular tone, or intensity, of this color, ranging from a minimum tone or intensity to a maximum tone or intensity. However, most types of printing devices can actually output colorant such as toner in just a binary manner: for a given color, each part— such as each pixel, each portion of each pixel, or other picture element location—is printed at a maximum tone or intensity or is not printed at all.

Halftoning reproduces continuous-tone images using binary tones. A tone reproduction curve (TRC) corrects the tones of an image prior to halftoning being performed. The TRC may also be referred to as a tone response curve. A TRC is applied to a desired tone value, to adjust for dot gain and other characteristics of a given printing device and/or a given printing device type. More specifically, a TRC is applied to a digital image prior to printing, so that the tone or intensity of each part of the printed image optimally approximates the tone or intensity of the corresponding part of the original digital image. Using a TRC thus ensures that the printed image optimally better reflects the digital image, from the perspective of the human visual system (HVS).

DETAILED DESCRIPTION

As noted in the background section, halftoning is an approach to reproduce continuous-tone images using binary tones, where a tone reproduction curve (TRC) is applied to correct the tones of an image before halftoning is performed. Desirably, a given type of printing device is able to print in accordance with a desired TRC regardless of different environmental and other factors. However, in actuality, this is not the case. Temperature and humidity, among other factors, can all affect whether a particular printing device can print in accordance with a desired TRC.

Embodiments of the disclosure provide for a two-part calibration process so that the TRC of a printing device, such as an electrophotographic (EP) printing device, matches as closely as possible a desired TRC. In the first part of the process, control parameters of the printing device are optimized using a process model to reduce a process TRC error between a process TRC and the desired TRC. This part can be performed external to the printing device, before the printing device is even manufactured, for a particular type of printing device. That is, for a given range of environmental and other factors, how various control parameters of the printing device are to be adjusted can be determined a priori, and then programmed into the device.

The process TRC can be considered as the TRC that takes into account the control parameters of the printing device without taking into account anything that the printing device has actually printed, and can be determined even before the printing device has been manufactured. The process TRC error is thus the error between the desired TRC and the process TRC that results from the process model. This model is a process model in the sense that it models the process by which the printing device will print an image on media without taking into account anything that the printing device has actually printed.

In the second part of the calibration process, tone-corrected halftone levels for the printing device are generated using a sensor model to reduce a printing device TRC error between the printing device's TRC and the desired TRC. This part is performed based on color patches printed by the printing device itself, using the optimized control parameters, where the color patches are measured by one or more sensors of the printing device. The tone-corrected halftone levels are then used by the printing device to print desired digital images, including graphics and/or text, on media like paper, in accordance with a halftoning approach.

The printing device's TRC is the actual TRC of the printing device, and takes into consideration the control patches printed by the printing device, as have been measured by the sensors of the printing device. The printing device TRC error can thus be considered as the error between the desired TRC and the printing device's TRC that results from the sensor model. This model is a sensor model in that it takes as input the actual intensity or tone values of the color patches printed by the printing device, as measured by the sensors of the printing device. It is noted that the printing device's TRC differs from the process TRC, in that the process TRC does not take into account the color patches printed by the printing device, as have been measured by the sensors of the printing device, whereas the printing devices TRC does.

The first part of the calibration process can be considering as imparting a coarse reduction in TRC error, specifically the process TRC error between the process TRC and the desired TRC. By comparison, the second part of the process can be considered as imparting a further, fine reduction in TRC error, specifically the printing device TRC error between the printing device's TRC and the desired TRC. In one embodiment, even before the printing device is manufactured, the control parameters for the printing device can be optimized using the process model to achieve a reduction in the process TRC error. The halftone levels used during halftoning are tone-corrected at the printing device itself using a sensor model that takes as input sensor measurements of color patches printed by the device using these control parameters, to then achieve a reduction in the printing device TRC error.

Figure 1:
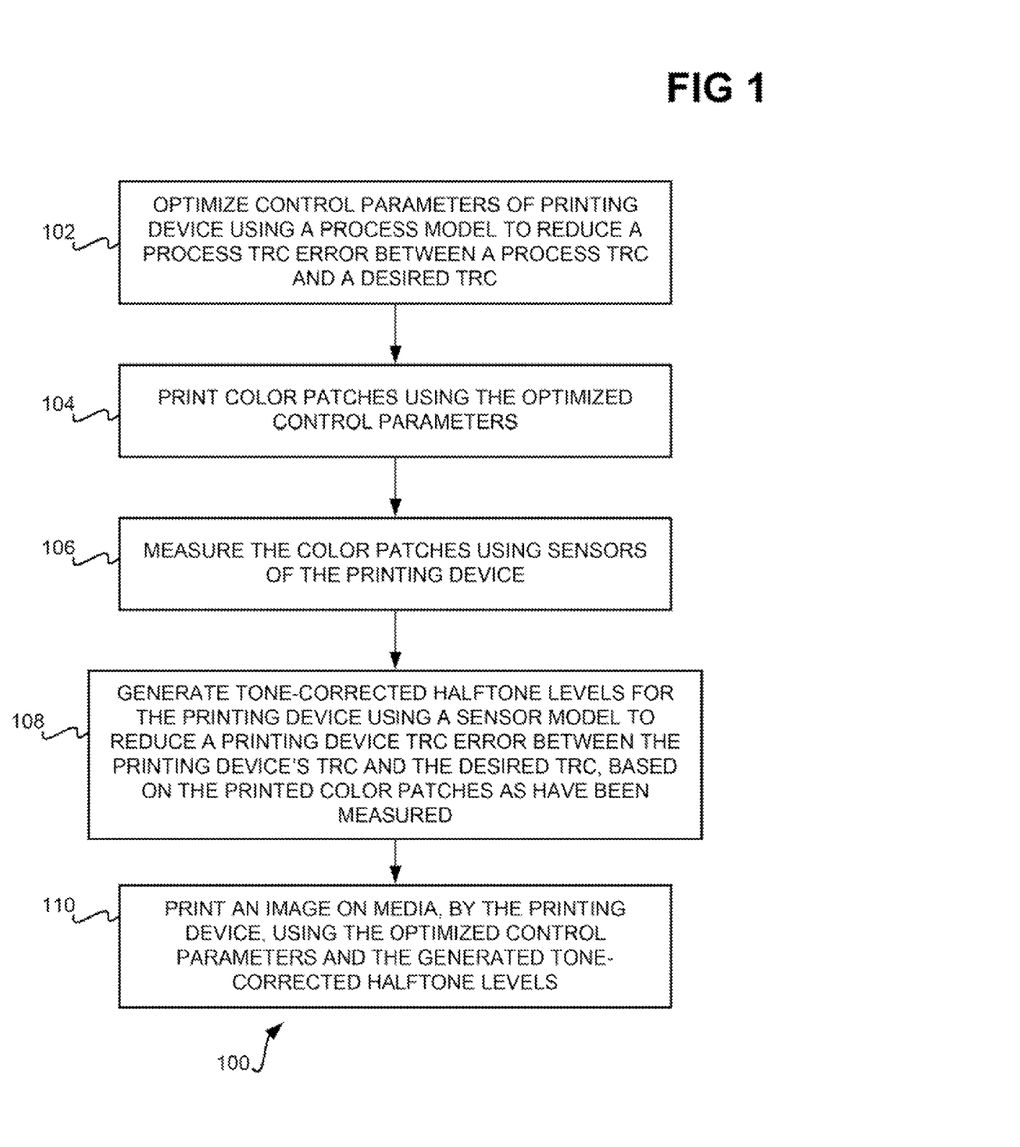
FIG. 1 is a flowchart of a method for calibrating a printing device to reduce tone reproduction curve (TRC) errors, according to an embodiment of the disclosure.

FIG. 1 shows a method 100 for calibrating a printing device to reduce TRC errors, according to an embodiment of the disclosure. The printing device may be an EP printing device, such as a laser printing device like a laser printer. Control parameters of the printing device are optimized using a process model to reduce the process TRC error between a process TRC and a desired TRC (102). The manner by which part 102 of the method 100 can be performed is described in more detail later in the detailed description. The desired TRC may also be referred to as the target TRC, and is the TRC that the printing device should desirably and ultimately achieve when printing images on media.

The model is a process model in the sense that it models the process by which the printing device prints an image on media, without considering anything—such as color patches—that the printing device has printed. The process model receives as input one or more disturbances and current values of the printing device's control parameters, and outputs the resulting process TRC. The control parameters can then be adjusted so that the process TRC more closely matches the desired TRC. The process TRC can be considered as the TRC that takes into consideration the control parameters of the printing device, and does not take into consideration anything the printing device has printed. For instance, the process TRC can take into account the control parameters of the printing device even before the printing device is actually manufactured.

The control parameters of the printing device are parameters that govern the output of colorant, such as toner, on media by the device. For example, in the context of an EP printing device, the control parameters can include the bias voltage of the printing device development subsystem. Other control parameters for an EP printing device include photoreceptor charge level, laser discharge energy, and toner tribocharge level. Still other control parameters for an EP printing device include the laser intensity or energy output, or similar parameters that control the transfer or development field strengths.

The disturbances that are also input into the process model are environmental and other factors that affect the ability of the printing device to realize the desired TRC. Some environmental factors include operating temperature and humidity of the printing device. Other such factors include the remaining life of the cartridge that includes or stores the colorant, such as toner, that the printing device uses to form images on media like paper. In this respect, the remaining life of the cartridge encompasses and/or is representative of the amount of colorant, such as toner, remaining, as well as the conditions of various parts within the cartridge, such as the optical photoconductor (OPC) drum, and so on, which can affect the ability of the printing device to realize the desired TRC. These parts degrade or wear over time. In general, the amount of colorant, such as toner, can be used as representative of the general state or condition of the materials within the cartridge that are associated with development and transfer of colorant onto media like paper.

Once the control parameters of the printing device have been optimized, a number of color patches are printed by the printing device, in accordance with (i.e., using) the optimized control parameters (104). The control parameters have been optimized in the sense that their values have been adjusted so that the process TRC as closely as possible matches the desired TRC. The color patches may be printed on media installed or transported within the printing device, such as paper, or on an internal belt or other mechanism permanently installed within the printing device.

The color patches may be a series of patches of each color of colorant, such as toner, of the printing device, including cyan, magenta, yellow, and black in the case of a four-colorant color printing device, and a single color such as black in the case of a one-colorant printing device. For example, for each colorant color, a number of patches from least intensity or tone to maximum intensity or tone may be printed, using the printing device's internal halftoning algorithm. The color patches that have been printed by the printing device are then measured using one or more sensors of the printing device (106).

Measuring the color patches by the printing device's sensors yields the actual intensity or tone of each color patch of each color of colorant. Therefore, how the printing device actually reproduces tone can be compared with how the printing device was expected to reproduce tone. As one example, for a given color of colorant, one color patch may correspond to 50% intensity or tone of the color, but the sensor measurement of the color patch may show that in actuality 45% intensity or tone was achieved.

Therefore, tone-corrected halftone levels for the printing device are generated using a sensor model, to reduce the printing device TRC error between the printing device's TRC and the desired TRC (108), based on the printed color patches as have been measured by the sensors. Halftone levels—and thus the tone-corrected halftone levels—are used by the printing device during halftoning so that images are printed by the printing device accurately. In the example of the previous paragraph, the printing device's TRC is adjusted, using the sensor model, so that when 50% intensity or tone of a color is desired to be printed, in actuality as close to 50% intensity or tone of the color is in fact printed.

The printing device's TRC is thus the TRC that takes into consideration the color patches printed by the printing device, as have been measured by the sensors of the printing device. In this respect, the printing device's TRC differs from the process TRC. Specifically, the process TRC does not take into consideration the color patches printed by the printing device, as have been measured by the sensors of the printing device. Indeed, as noted above, the process TRC can be determined even before the printing device has been manufactured.

The model is a sensor model in the sense that it takes as input the actual intensity or tone values of the printed color patches measured by the sensors of the printing device, along with one or more disturbances, examples of which have been described above. The model may further be considered a sensor model in the sense that it models the sensors themselves, so that inaccuracies and other characteristics of the sensors of the printing device are properly reflected within the model. Examples of sensors in this respect include optical sensors, for instance. The manner by which part 108 of the method 100 can be performed is described in more detail later in the detailed description. The sensor model thus differs from the process model at least in that the sensor model takes into account the actual intensity or tone values of the color patches printed by the printing device, whereas the process model does not.

In the method 100, part 102 can be considered as providing a coarse reduction in TRC error—specifically the process TRC error between the process TRC and the desired TRC—even before the printing device has been used, and thus even before the printing device has been manufactured. By comparison, part 108 can be considered as providing a finer reduction in TRC error—specifically the printing device TRC error between the printing device's TRC and the desired TRC—so that the printing device's TRC even more closely matches the desired TRC than the process TRC does. This two-part process therefore results in a better calibration of the printing device as compared to if just a one-part process were performed.

Once the tone-corrected halftone levels have been generated, a desired image can be printed on media like paper by the printing device (110). The result of the calibration process of parts 102 through 108 of the method 100 is that the desired image is printed with better accuracy than if the calibration process had not been performed. The printing device uses the optimized control parameters generated in part 102, and the tone-corrected halftone levels generated in part 108, when printing the desired image. The desired image may include text, graphics, or a combination of text and graphics.

Figure 2:
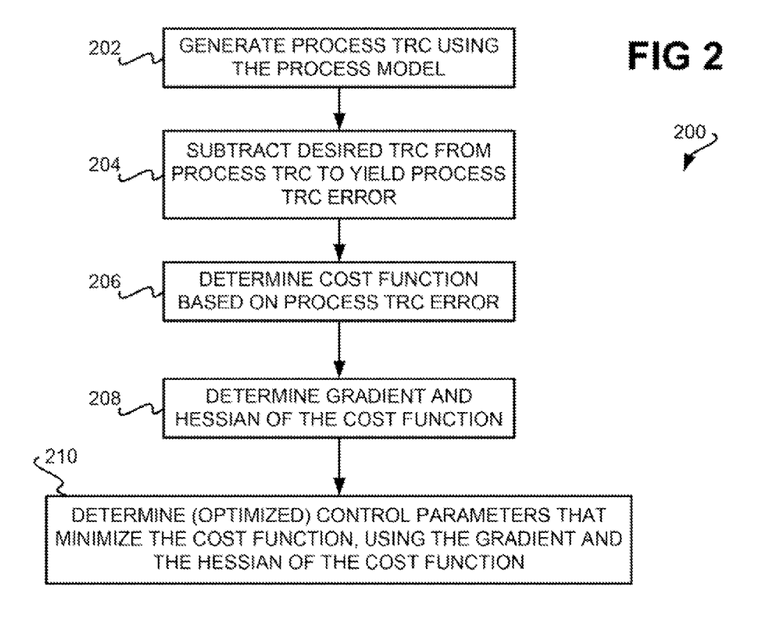
FIG. 2 is a flowchart of a method for optimizing control parameters of a printing device using a process model to reduce a process TRC error, and which can be performed as one part of the method of FIG. 1, according to an embodiment of the disclosure.

FIG. 2 shows a method 200 for optimizing the control parameters of a printing device using a process model to reduce process TRC error, according to an embodiment of the disclosure. The method 200 can be performed in part 102 of the method 100 of FIG. 1. The process TRC is first generated using a process model (202).

The process model receives as input the current values of the printing device's control parameters, and current values of one or more disturbances. As output, the process model generates the process TRC based on these control parameters and disturbances. Mathematically, a process model f provides a process TRC ŷ from control parameters u and uncontrollable but measurable disturbances d.

More specifically $u=[u_i] \in R^m$ denote the control parameters, where $R^m$ is the set of all such control parameters. Similarly, $d=[d_i] \in R^n$ denotes the disturbances, where $R^n$ is the set of all such disturbances. The process TRC can be approximated as its response at a finite number of halftone levels. For example, where an eight-bit integer is used to represent a halftone level, zero can represent no tone, and $2^8-1=255$ can represent maximum tone.

Therefore, $\hat{y}=[y_i] \in R^q$ denotes the tone values measured on output media from color patches printed at halftone levels $h=[h_i]$, where $h_i$ 531 [0,255] for halftone levels represented by eight-bit integers, and where $R^q$ is the set of all tone values. In one embodiment, a tone value may be defined as a Euclidean distance in the CIE L*a*b color space between the measured color and the appearance color of the underlying media. As such, a larger tone value corresponds to a stronger color intensity. It is noted that tore values defined in this embodiment can be represented by the CIE unit $\Delta E^*$.

The process model f is thus $f:R^{m \times n} \to R^q$ and can be expressed as $$\hat{y} = f(u, d) = \begin{pmatrix} f_1(u, d, h_1) \\ \vdots \\ f_q(u, d, h_q) \end{pmatrix}. \quad (1)$$

In one embodiment, the predetermined halftone levels h do not change. As such, these predetermined halftone levels can be omitted from the expression of equation (1).

Furthermore, the process model f can be a quadratic polynomial response-surface model in one embodiment, the general form of which is:

$$\hat{y}_i = \beta_{i0} + \sum_j \beta_{ij} x_j + \sum_j \beta_{ijj} x_j^2 + \sum_j \sum_k \beta_{ijk} x_j x_k. \quad (2)$$

In equation (2), $\hat{y}_i$ is the predicted tone level at halftone level $h_i$, and x is an explanatory variable that is either a control parameter $u_1$ or a disturbance $d_i$. The various β's are coefficients that are identified through regression analysis. It is noted, however, that in other embodiments, the process model can be a polynomial response-surface model that is not quadratic, and in still other embodiments, the process model can be a model that is not a polynomial response-surface model.

Once the process TRC has been generated using the process model, the desired TRC is subtracted from the process TRC to yield the process TRC error between the process TRC and the desired TRC (204). The desired TRC may be referred to as $r=[r_i] \in R^q$, and specified at the same halftone levels as the predetermined halftone levels h of the process TRC. The process TRC error is thus referred to as $\hat{e} \in R^q$, and can be determined from the process model f as $\hat{e}=f(u,d)-r$.

Next, a cost function based on the process TRC error is determined (206). The cost function is ultimately minimized to minimize the process TRC error between the process TRC and the desired TRC. In one embodiment, the cost function is a quadratic cost function, expressed as $s \in R$, and can be defined as:

$$s(\hat{e},u) = \|\hat{e}\|_Q^2 + \|u\|_V^2 = \hat{e}^T Q \hat{e} + u^T V u. \quad (3)$$

In equation (3), Q and V are symmetric positive semi-definite weighting and scaling matrices with appropriate dimensions, and T is the transpose operator for a matrix. Furthermore, a set of optimal control parameters u* that minimize the cost function s can be expressed as:

$$u^* = \underset{u \in U}{\arg\min} \, s. \quad (4)$$

In equation (4), $U \in R^m$ which is a finite set of allowable control parameters. It is noted, however, that in other embodiments, the cost function can be a function that is not quadratic.

Given the set of allowable control parameters U, the desired TRC r, arts the weighting matrices Q and V, a locally optimized u* that minimizes the cost function s satisfies a second-order sufficient condition (SOS). The SOSC can be expressed as:

$$\begin{cases} \nabla s(u^*) = 0 \\ \nabla^2 s(u^*) > 0. \end{cases} \quad (5)$$

In equation (5), $\nabla s(u^*) \in R^q$ and $\nabla^2 s(u^*) \in R^{q \times q}$. Furthermore, $\nabla^2 s(u^*) > 0$ means that $\nabla^2 s(u^*)$ is positive definite.

The gradient and the Hessian of the cost function are determined (208). Specifically, the gradient can be expressed as:

$$\nabla s = \frac{\partial s}{\partial u} = 2 \frac{\partial f(u, d)}{\partial u} Q(f(u, d) - r) + 2Vu. \quad (6)$$

The Hessian can be expressed as:

$$\nabla^2 s = \frac{\partial (\nabla s)}{\partial u} = \quad (7)$$
$$2 \frac{\partial f(u, d)}{\partial u} Q \left( \frac{\partial f(u, d)}{\partial u} \right)^T + 2 \frac{\partial^2 f(u, d)}{\partial u^2} Q(f(u, d) - r) + 2V.$$

In equations (6) and (7), $$\frac{\partial f}{\partial u}$$

is a q×m Jacobian matrix.

The optimized control parameters that minimize the cost function are thus determined, using the gradient and the Hessian of the cost function (210). That is, the control parameters of the printing device are optimized by minimizing the cost function. This can be accomplished by solving equation (4) such that the SOSC of equation (5) is satisfied, using the gradient of equation (6) and the Hessian of equation (7). The result of the method 200 is, therefore, a set of optimized control parameters u*, which are the optimized values of the control parameters u that minimize the cost function s, and thus that minimize the process TRC error ê between the process TRC of the printing device and the desired TRC.

As noted above, part 102 of the method 100 of FIG. 1 and thus the method 200 of FIG. 2 can be performed before the printing device in question is used or even manufactured. That is, part 102 and thus the method 200 can be performed offline. The results of part 102 and thus the method 200 can then be stored in look-up tables for reference by the printing device when the printing device is actually used.

For instance, $D \in R^n$ can denote the finite set of measurable disturbances that covers all admissible environmental conditions and consumable colorant factors in typical user usage. The optimal control parameters u* for this admissible disturbance set D can be determined a priori and stored. When the printing device is to be calibrated, the optimal control parameters u* are then looked up within the tables based on the current measured disturbances d. Performing part 102 of the method 100 and thus the method 200 in this manner expedites calibration of the printing device.

Figure 3:
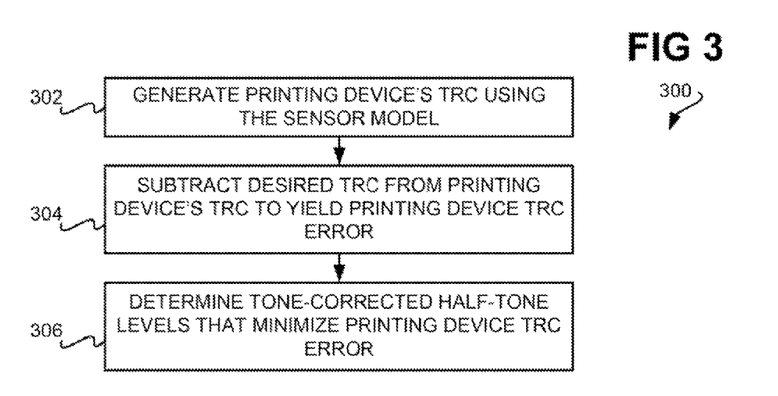
FIG. 3 is a flowchart of a method for generating tone-corrected halftone levels for a printing device using a sensor model to reduce a printing device TRC error, and which can be performed as another part of the method of FIG. 1, according to an embodiment of the disclosure.

FIG. 3 shows a method 300 for generating tone-corrected halftone levels for a printing device using a sensor model to reduce printing device TRC error, according to an embodiment of the disclosure. The method 300 can be performed in part 108 of the method 100 of FIG. 1. The printing device's TRC is first generated using a sensor model (302).

The sensor model receives as input the values of color patches printed by the printing device, where these values are measured by one or more sensors of the printing device. The sensor model also receives as input current values of one or more disturbances. As output, the sensor model generates the printing device's TRC based on these measured color patch values and disturbances. Mathematically, a sensor model g provides the printing device's TRC ŷ from color patch values (i.e., sensor values) w and uncontrollable but measurable disturbances d.

More specifically, $w=[w_j] \in R^p$ denotes the color patch values as measured by the sensor, where $R^p$ the set of all such values. As before, $d=[d_i] \in R^n$ denotes the disturbances, where $R^n$ is the set of all such disturbances. The sensor model g is thus $g:R^{p \times n} \to R^q$ and can be expressed as $$\hat{y} = g(w, d) = \begin{pmatrix} g_1(w, d, h_1) \\ \vdots \\ g_q(w, d, h_q) \end{pmatrix}. \tag{8}$$

In one embodiment, as in the process model, the predetermined halftone levels h do not change, and can be omitted from the expression of equation (8). Furthermore, in one embodiment, the sensor model g is a principal component regression model.

Once the printing device's TRC has been generated using the sensor model, the desired TRC is subtracted from the printing device's TRC to yield the printing device TRC error between the printing device's TRC and the desired TRC (304). As in the method 200, the printing device TRC error may be referred to as $\hat{e} \in R^q$. As such, the printing device TRC error can be determined from the sensor model g as ê=g(w, d)−r, where as before $r=[r_i] \in R^q$ represents the desired TRC.

Tone-corrected halftone levels that reduce (e.g., minimize) the printing device TRC error are then determined (306). This can be achieved for each tone level of the desired TRC by selecting a corresponding tone-corrected halftone level that minimizes the printing device TRC error. In one embodiment, a look-up table (LUT) is employed to look up each tone-corrected halftone level, based on a corresponding tone level of the desired TRC. That is, the LUT is a mapping, LUT:$h_i \to \bar{h}_i$, which relates desired halftone levels $h_i$ to tone-corrected halftone levels $\bar{h}_i$, where $\bar{h}_i \in [0,255]$ when each halftone level is represented by an eight-bit integer.

Tone correction can be considered as a model inverse to the desired TRC. A tone-corrected halftone level $\bar{h}_i$ is thus determined by identifying a halftone level at which the tone value error is minimized. That is, $$\bar{h}_i = \arg\min(|g(w,d,\bar{h}_i)-r_i|). \tag{9}$$

In one embodiment, just a limited subset of halftone levels is racked within the printing device's TRC. As such, the tone-corrected halftone levels $\bar{h}$ can be determined by interpolating between two neighboring halftone levels.

For example, interpolation, such as linear interpolation, can be applied. Specifically, a tone-corrected halftone level $\bar{h}_j$ corresponding to a target or desired tone value $r_i$ can be determined by:

$$\bar{h}_j = \frac{r_i - g_j(w, d, h_j)}{g_{j+1}(w, d, h_{j+1}) - g_j(w, d, h_j)}(h_{j+1} - h_j) + h_j. \tag{10}$$

In equation (10), $h_j$ and $h_{j+1}$ are the two halftone levels associated with the neighboring tone values and $g_j(w, d, h_j)$ and $g_{j+1}(w, d, h_{j+1})$ of target or desired tone value $r_i$. In other words, $g_j(w, d, h_j) < r_j < g_{j+1}(w, d, h_{j+1})$.

Figure 4:
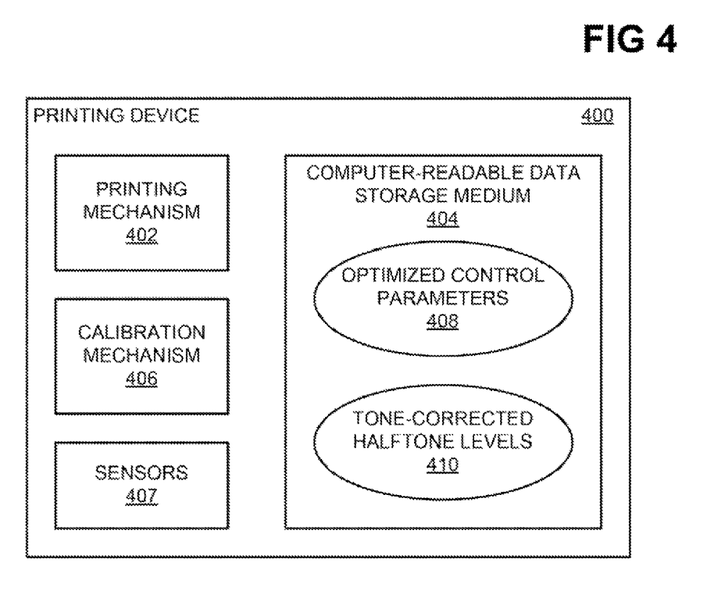
FIG. 4 is a block diagram of a printing device, according to an embodiment of the disclosure.

FIG. 4 shows a printing device 400, according to an embodiment of the disclosure. The printing device 400 includes at least a printing mechanism 402, a computer-readable data storage medium 404, a calibration mechanism 406, and one or more sensors 407. The printing device 400 may be a printer. The printing mechanism 402 can be an EP printing mechanism, such as a laser-printing mechanism. The printing mechanism 402 prints an image on media, such as paper.

The computer-readable data storage medium 404 may be a semiconductor memory, such as a flash memory or a read-only memory, a magnetic medium, such as a hard disk drive, or another type of medium. The data storage medium 404 stores optimized control parameters 408 for the printing device 400, and tone-corrected halftone levels 410. As described above, the optimized control parameters 408 may be stored within one or more tables, and encompass the optimized control parameters for the permissible values of the disturbances that are likely to be encountered during normal usage of the printing device 400 by a user. That is, the control parameters 408 can be optimized externally—that is, offline or a priori—and stored in one or more tables.

The calibration mechanism 406 calibrates the printing device 400, and more specifically the printing mechanism 402. In particular, calibration mechanism 406 retrieves the optimized control parameters 408 for the current values of the disturbances. The calibration mechanism 406 then causes the printing mechanism 402 to print a series of color patches, and causes the sensors 407 to measure the printed color patches. On the basis of the disturbances and the printed color patches as measured, the calibration mechanism 406 generates the tone-corrected halftone levels 410 and stores them in the computer-readable data storage medium 404.

The printing mechanism 402 therefore subsequently prints a desired image on media, using the optimized control parameters 408 and the tone-corrected halftone levels 410. The calibration mechanism 406 itself can be implemented as software, hardware, or a combination of software and hardware. For instance, the calibration mechanism 406 may be one or more computer programs firmware) stored on the computer-readable data storage medium 404 for execution by a processor, or the mechanism 406 may have its logic implemented as an application-specification integrated circuit (ASIC), a field-programmable device such as a field-programmable gate array (FPGA), and so on. Furthermore, the sensors 407 may be optical sensors in one embodiment.

Figure 5:
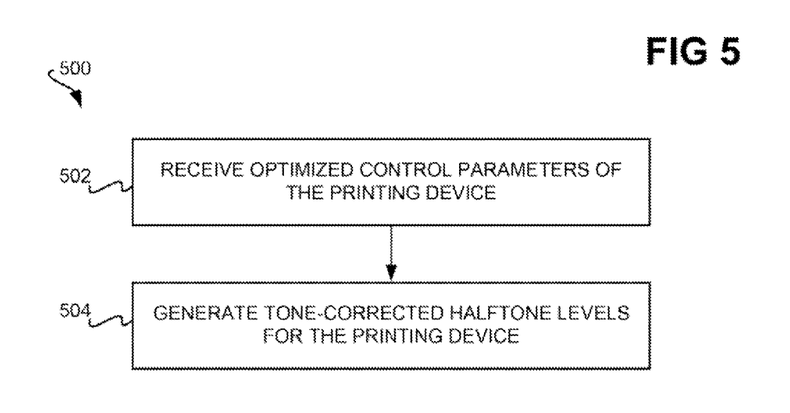
FIG. 5 is a flowchart of a method that can be performed by a printing device for calibrating the printing device to minimize TRC errors, according to an embodiment of the disclosure.

In conclusion, FIG. 5 shows a method 500 that can be performed to calibrate the printing device 400, according to an embodiment of the disclosure. The method 500 may be performed by the calibration mechanism 406 of the printing device 400. As such, as noted above, the method 500 may be implemented as one or more computer programs stored on the computer-readable data storage medium 404 for execution by a processor of the printing device 400. However, in one embodiment, the computer-readable data storage medium that stores the computer programs may be considered as an ASIC that has been appropriately programmed to execute the method 500, or as a field-programmable device, such as an FPGA, that has been appropriately programmed to execute the method 500.

The method 500 receives the optimized control parameters 408 of the printing device 400 (502). For instance, the calibration mechanism 406 can look up the optimized control parameters 408 in a table, based on the current values of the disturbances. The method 500 then generates tone-corrected halftone levels for the printing device (504). For instance, the calibration mechanism 406 can perform parts 104, 106, and 108 of the method 100 of FIG. 1. As part 108 of the method 100, the calibration mechanism 406 can perform the method 300 of FIG. 3.

We claim:

1. A method of reducing tone reproduction curve (TRC) error for a printing device, the method being performed by one or more processors of the printing device and comprising:
   measuring one or more disturbances affecting the printing device;
   using a process model including:
      generating a process TRC based on control parameters of the printing device and the one or more measured disturbances;
      determining a process TRC error based on a desired TRC and the process TRC;
      determining a cost function based on the process TRC error; and
      optimizing the control parameters to minimize the cost function in order to reduce the process TRC error;
   measuring a plurality of color patches printed by the printing device based on the optimized control parameters; and
   using a sensor model including generating a plurality of tone-corrected halftone levels for the printing device to reduce a printing device TRC error between a TRC of the printing device and the desired TRC.

2. The method of claim 1, further comprising:
   printing an image on media using the optimized control parameters and the plurality of tone-corrected halftone levels.

3. The method of claim 1, wherein optimizing the control parameters comprises:
   determining a gradient and a Hessian of the cost function; and
   minimizing the cost function by using the gradient and the Hessian.

4. The method of claim 1, wherein the cost function is a quadratic cost function.

5. The method of claim 1, wherein the one or more disturbances comprise one or more of:
   a temperature affecting the printing device;
   a humidity affecting the printing device; or
   a remaining life of a cartridge including colorant that the printing device uses to print on media.

6. The method of claim 1, wherein the process model is a quadratic polynomial response-surface model.

7. The method of claim 1, wherein generating the plurality of tone-corrected halftone levels comprises:
   based on the one or more disturbances and the plurality of color patches, generating the TRC of the printing device using the sensor model;
   subtracting the desired TRC from the TRC of the printing device to yield the printing device TRC error; and
   determining the tone-corrected halftone levels for the printing device that minimize the printing device TRC error.

8. The method of claim 7, wherein determining the tone-corrected halftone levels comprises, for each tone level of the desired TRC, selecting a corresponding tone-corrected halftone level that minimizes the printing device TRC error.

9. The method of claim 7, wherein determining the tone-corrected halftone levels comprises:
   employing a look-up table (LUT) to look up each tone-corrected halftone level based on a corresponding tone level of the desired TRC; and
   interpolating each tone-corrected halftone level.

10. The method of claim 1, wherein the one or more disturbances comprise one or more of:
    an operating temperature of the printing device; or
    an operating humidity of the printing device.

11. The method of claim 1, wherein the sensor model is a principal component regression model.

12. A printing device comprising:
    a printing mechanism to print an image on media;
    one or more sensors;
    one or more processors; and
    one or more memory resources storing instructions that, when executed by the one or more processors, cause the printing device to:
       measure one or more disturbances affecting the printing mechanism;
       use a process model to:
          generate a process tone reproduction curve (TRC) based on control parameters of the printing mechanism and the one or more measured disturbances;
          determine a process TRC error based on a desired TRC and the process TRC;
          determine a cost function based on the process TRC error; and optimize the control parameters to minimize the cost function in order to reduce the process TRC error;
using the one or more sensors, measure a plurality of color patches printed by the printing mechanism based on the optimized control parameters; and
use a sensor model to generate a plurality of tone-corrected halftone levels for the printing device to reduce a printing device TRC error between a TRC of the printing device and the desired TRC.

13. The printing device of claim 12, wherein to generate the plurality of tone-corrected halftone levels comprises:
use the sensor model to:
generate the TRC of the printing device based on the one or more disturbances and the plurality of color patches;
subtract the desired TRC from the TRC of the printing device to yield the printing device TRC error; and
determine the tone-corrected halftone levels for the printing device that minimize the printing device TRC error.

14. A non-transitory computer-readable medium storing instructions for reducing tone reproduction curve (TRC) error for a printing device, wherein the instructions, when executed by one or more processors of the printing device, cause the printing device to:
use a process model to optimize a plurality of control parameters of the printing device to reduce a TRC error between a process TRC and a desired TRC;
measure one or more disturbances affecting the printing device;
measure a plurality of color patches printed by the printing device based on the optimized control parameters; and
use a sensor model to:
generate a TRC of the printing device based on the one or more disturbances and the plurality of color patches;
determine a printing device TRC error based on the desired TRC and the TRC of the printing device; and
generate a plurality of tone-corrected halftone levels that minimize the printing device TRC error.

15. The non-transitory computer-readable medium of claim 14, wherein to optimize the control parameters comprises:
use the process model to:
generate the process TRC based on control parameters of the printing device and the one or more measured disturbances;
substract the desired TRC from the process TRC to yield the process TRC error;
determine a cost function based on the process TRC error; and
determine the control parameters that minimize the cost function.

* * * * *